United States Patent Office 3,499,891
Patented Mar. 10, 1970

3,499,891
SPIRO(STEROIDAL-6,1'-CYCLOPROPANES)
AND PROCESS
Frank B. Colton, Evanston, and Robert T. Nicholson, Glenview, Ill., assignors to G. D. Searle & Co., Chicago, Ill., a corporation of Delaware
No Drawing. Continuation-in-part of application Ser. No. 389,183, Aug. 12, 1964. This application Aug. 24, 1964, Ser. No. 391,759
Int. Cl. C07d 7/06; C07c 169/24, 173/00
U.S. Cl. 260—239.57       10 Claims This application is a continuation-in-part of our copending application Ser. No. 389,183, filed Aug. 12, 1964 now U.S. Patent No. 3,261,829.

This invention is concerned with (spiro-cyclopropyl)-substituted steroids and, more particularly, with spiro-(steroidal-6,1'-cyclopropanes) and related derivatives together with a novel process for their manufacture. The novel spiro compounds of this invention can be represented by the following partial structural formula

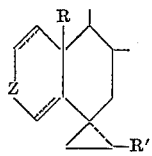

wherein Z is symbolic of a carbonyl, hydroxymethylene, (lower alkanoyl)oxymethylene or methylene radical, R represents hydrogen or a methyl radical, R' can be either hydrogen or a lower alkyl radical, and the dotted lines indicate optional 1,2 and/or 4,5 double bonds.

Typical of the lower alkyl radicals represented by R' are methyl, ethyl, propyl, butyl, pentyl, hexyl, and the branched-chain groups isomeric therewith. The lower alkanoyl radicals encompassed in the Z term are exemplified by acetyl, propionyl, butyryl, valeryl, caproyl, and the branched-chain isomers thereof.

The novel process of the present invention involves the conversion illustrated by the following partial structural formulas:

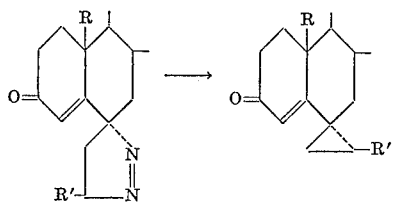

The spiro-pyrazoline starting materials are produced by reaction of the corresponding 6-methylene derivatives with a diazo(lower alkane), as is illustrated below:

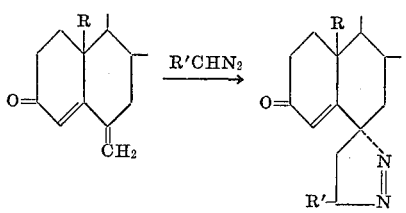

Those 6-methylene derivatives together with methods for their manufacture are disclosed in U.S. Patent 2,980,-711 and 3,112,305. The latter-depicted process is conveniently carried out by adding an ethereal solution of the diazo(lower alkane) to the appropriate 6-methylene compound dissolved in a suitable solvent, and allowing the mixture to stand at or near room temperature until reaction is complete. In that manner, an ethereal solution of diazomethane is contacted with 17α-acetoxy-6-methylene-pregn-4-ene-3,20-dione dissolved in tetrahydrofuran to produce 17α-acetoxy-3,20-dioxo-spiro(pregn-4-ene-6,3'-1-pyrazoline). Conversion of these 6-spiro-pyrazoline intermediates to the corresponding instant 6-spiro-cyclopropyl compounds is suitably effected by heating at elevated temperature, optionally in a suitable organic solvent medium. An alternate procedure involves reaction at room temperature in the presence of a suitable acidic catalyst such as boron trifluoride, hydrogen chloride, aluminum chloride, etc. The aforementioned 17α-acetoxy-3,20-dioxo-spiro-(pregn-4-ene-6,3'-1-pyrazoline), for example, in acetone is contacted with boron trifluoride etherate at room temperature to produce 17α-acetoxy-3,20-dioxo-spiro(pregn-4-ene-6,1'-cyclopropane).

Additional examples of 6-methylene starting materials and the 6-spiro-pyrazoline and 6-spiro-cyclopropyl compounds derived therefrom are given below.

6-methyleneandrost-4-ene-3,17-dione:
    3,17-dioxo-spiro(androst-4-ene-6,3'-1-pyrazoline):
        3,17-dioxo-spiro(androst-4-ene-6,1'-cyclopropane).

17β-acetoxy-6-methyleneandrost-4-en-3-one:
    17β-acetoxy-3-oxo-spiro(androst-4-ene-6,3'-1-pyrazoline):
        17β-acetoxy-3-oxo-spiro(androst-4-ene-6,1'-cyclopropane).

17β - hydroxy-17α-methyl-6-methyleneandrost-4-en-3-one:
    17β-hydroxy-17α-methyl-3-oxo-spiro(androst-4-ene-6,3'-1-pyrazoline):
        17β-hydroxy-17α-methyl-3-oxo-spiro(androst-4-ene-6,1'-cyclopropane).

17β-hydroxy-6-methyleneandrost-4-en-3-one:
    17β-hydroxy-3-oxo-spiro(androst-4-ene-6,3'-1-pyrazoline):
        17β-hydroxy-3-oxo-spiro(androst-4-ene-6,1'-cyclopropane).

17β-acetoxy-17α-methyl-6-methyleneandrost-4-en-3-one:
    17β-acetoxy-17α-methyl-3-oxo-spiro(androst-4-ene-6,3'-1-pyrazoline):
        17β-acetoxy-17α-methyl-3-oxo-spiro(androst-4-ene-6,1'-cyclopropane).

17β-acetoxy-6-methylene-estr-4-en-3-one:
    17β-acetoxy-3-oxo-spiro(estr-4-ene-6,3'-1-pyrazoline):
        17β-acetoxy-3-oxo-spiro(estr-4-ene-6,1'-cyclopropane).

17β-acetoxy-17α-vinyl-6-methylenandrost-4-en-3-one:
    17β-acetoxy-3-oxo-17α-vinyl-spiro(androst-4-ene-6,3'-1-pyrazoline):
        17β-acetoxy-3-oxo-17α-vinyl-spiro(androst-4-ene-6,1'-cyclopropane).

17β-propionoxy-17α-propynyl-6-methyleneandrost-4-en-3-one:
    3-oxo-17β-propionoxy-17α-propynyl-spiro(androst-4-ene-6,3'-1-pyrazoline):
        3-oxo-17β-propionoxy-17α-propynyl-spiro-(androst-4-ene-6,1'-cyclopropane).

17α-ethynyl-17β-hydroxy-6-methyleneandrost-4-en-3-one:
    17α-ethynyl-17β-hydroxy-3-oxo-spiro(androst-4-ene-6,3'-1-pyrazoline):
        17α-ethynyl-17β-hydroxy-3-oxo-spiro(androst-4-ene-6,1'-cyclopropane).

17α-ethyl-17β-hydroxy-6-methyleneandrost-4-en-3-one:
    17α-ethyl-17β-hydroxy-3-oxo-spiro(androst-4-ene-6,3'-1-pyrazoline):
        17α-ethyl-17β-hydroxy-3-oxo-spiro(androst-4-ene-6,1'-cyclopropane).

17β-propionoxy-6-methyleneandrost-4-en-3-one:
    3-oxo-17β-propionoxy-spiro(androst-4-ene-6,3'-1-pyrazoline):
        3-oxo-17β-propionoxy-spiro(androst-4-ene-6,1'-cyclopropane).

6-methylenepregn-4-ene-3,20-dione:
    3,20-dioxo-spiro(pregn-4-ene-6,3'-1-pyrazoline):
        3,20-dioxo-spiro(pregn-4-ene-6,1'-cyclopropane).

17α-acetoxy-6-methylenepregn-4-ene-3,20-dione:
    17α-acetoxy-3,20-dioxo-spiro(pregn-4-ene-6,3'-1-pyrazoline):
        17α-acetoxy-3,20-dioxo-spiro(pregn-4-ene-6,1'-cyclopropane).

6-methylene-17α-propionoxypregn-4-ene-3,20-dione:
    17α-propionoxy-3,20-dioxo-spiro(pregn-4-ene-6,3'-1-pyrazoline):
        17α-propionoxy-3,20-dioxo-spiro(pregn-4-ene-6,1'-cyclopropane).

17α-acetoxy-21-fluoro-6-methylenepregn-4-ene-3,20-dione:
    17α-acetoxy-21-fluoro-3,20-dioxo-spiro(pregn-4-ene-6,3'-1-pyrazoline):
        17α-acetoxy-21-fluoro-3,20-dioxo-spiro(pregn-4-ene-6,1'-cyclopropane).

3-(17β-hydroxy-6-methylen-3-oxo-androst-4-en-17α-yl)-propionic acid lactone:
    3-[17β-hydroxy-3-oxo-spiro(androst-4-ene-6,3'-1-pyrazolin)-17α-yl] propionic acid lactone:
        3-[17β-hydroxy-3-oxo-spiro(androst-4-ene-6,1'-cyclopropan)-17α-yl] propionic acid lactone.

21-acetoxy-6-methylenepregn-4-ene-3,20-dione:
    21-acetoxy-3,20-dioxo-spiro(pregn-4-ene-6,3'-1-pyrazoline):
        21-acetoxy-3,20-dioxo-spiro(pregn-4-ene-6,1'-cyclopropane).

21-acetoxy-17α-hydroxy-6-methylenepregn-4-ene-3,20-dione:
    21-acetoxy-17α-hydroxy-3,20-dioxo-spiro(pregn-4-ene-6,3'-1-pyrazoline):
        21-acetoxy-17α-hydroxy-3,20-dioxo-spiro-(pregn-4-ene-6,1'-cyclopropane).

21-acetoxy-17α-hydroxy-6-methylenepregn-4-ene-3,11,20-trione:
    21-acetoxy-17α-hydroxy-3,11,20-trioxo-spiro(pregn-4-ene-6,3'-1-pyrazoline):
        21-acetoxy-17α-hydroxy-3,11,20-trioxo-spiro-(pregn-4-ene-6,1'-cyclopropane).

21-acetoxy-11β,17α-dihydroxy-6-methylenepregn-4-ene-3,20-dione:
    21-acetoxy-11β,17α-dihydroxy-3,20-dioxo-spiro-(pregn-4-ene-6,3'-1-pyrazoline):
        21-acetoxy-11β,17α-dihydroxy-3,20-dioxo-spiro(pregn-4-ene-6,1'-cyclopropane).

Reduction of the instant 3-keto derivatives affords the corresponding 3β-hydroxy compounds, while dehydrogenation of the $\Delta^4$ compounds affords the corresponding $\Delta^{1,4}$ derivatives. 17β-acetoxy-3-oxo-spiro(androst-4-ene-6,1'-cyclopropane) is thus contacted with lithium tri-(tertiary-butoxy) aluminum hydride to afford 17β-acetoxy-3β-hydroxy-spiro(androst-4-ene-6,1'-cyclopropane), while the reaction of 17α-acetoxy-3,20-dioxo-spiro(pregn-4-ene-6,1'-cyclopropane) in benzene with 2,3-dichloro-5,6-dicyano-1,4-benzoquilone affords 17α-acetoxy-3,20-dioxo-spiro(pregna-1,4-diene-6,1'-cyclopropane).

The instant A-ring saturated compounds are conveniently obtained by reduction of the corresponding $\Delta^4$ derivatives with a suitable reagent such as lithium in liquid ammonia. In that manner, 17β-acetoxy-3-oxo-spiro-(androst-4-ene-6,1'-cyclopropane) is converted to 17β-acetoxy-3-oxo-spiro(5α-androstan-6,1'-cyclopropane). Dehydrogenation of those A-ring saturated derivatives with a reagent such as 2,3-dichloro-5,6-dicyano-1,4-benzoquinone or chloranil affords the corresponding $\Delta^1$ compounds. The aforementioned 17β-acetoxy-3-oxo-spiro(5α-androstan-6,1'-cyclopropane) is thus heated with 2,3-dichloro-5,6-dicyano-1,4-benzoquinone to yield 17β-acetoxy-3-oxo-spiro(5α-androst-1-ene-6,1'-cyclopropane).

The 3-desoxygenated derivatives of the present invention can be produced from the corresponding 3-keto compounds by a two-step process involving conversion of the keto group to a thioketal followed by cleavage of that function by reaction in a suitable reducing medium such as sodium in liquid ammonia. By that process, 17β-acetoxy-3-oxo-spiro(androst-4-ene-6,1'-cyclopropane), for example, in acetic acid is contacted with ethanedithiol in the present of boron trifluoride etherate to afford 17β-acetoxy - 3,3 - ethylenedithio - spiro(androst-4-ene-6,1'-cyclopropane), and that thioketal is contacted with sodium in liquid ammonia to afford 17β-hydroxy-spiro (androst-4-ene-6,1'-cyclopropane).

Oxidation of the instant 17-hydroxy compounds results in the corresponding 17-keto substances. Reaction of 17β-hydroxy - 3 - oxo - spiro(androst-4-ene-6,1'-cyclopropane), for example, in acetone with aqueous chromic acid results in 3,17-dioxo-spiro(androst-4-ene-6,1'-cyclopropane).

Acylation of the instant hydroxy derivatives with a lower alkanoic acid anhydride or halide, preferably in the presence of a suitable acid acceptor, affords the corresponding (lower alkanoyl)oxy compounds. Reaction of 17β - acetoxy-3β-hydroxy-spiro(androst-4-ene-6,1'-cyclopropane), for example, with acetic anhydride and pyridine affords 3β,17β - diacetoxy-spiro(androst-4-ene-6,1'-cyclopropane).

The compounds of the present invention display valuable pharmacological properties. Those compounds of the testosterone and 19-nortestosterone structure are anabolic and androgenic agents; those of the progesterone, 17 - alkenyltestosterone, and 17 - alkynyltestosterone ring structure, together with the corresponding 19-nor derivatives, exhibit potent progestational activity; those carrying a dihydroxyacetone side chain at the 17-position exhibit anti-inflammatory activity; those derived from desoxycorticosterone display salt-retaining properties; and the instant derivatives of the 17-spiro-lactone structure are diuretic agents in view of their potent aldosterone-inhibitory activity.

The invention will appear more fully from the examples which follow. These examples are given by way of illustration only and are not to be construed as limiting the invention either in spirit or in scope as many modifications both in materials and methods will be apparent to those skilled in the art. Temperatures are given in degrees centigrade (° C.) and quantities of materials in parts by weight unless otherwise noted.

EXAMPLE 1

To a solution of 3 parts of 17α-acetoxy-6-methylene-pregn-4-ene-3,20-dione in 225 parts of tetrahydrofuran is added, dropwise over a period of about 5 minutes, a solution of 2 parts of diazomethane in 70 parts of ether. The resulting reaction mixture is stored at room temperature for about 13 days, after which time approximately 0.1 part of acetic acid is added in order to decompose the excess reagent. Evaporation to approximately ½ volume under reduced pressure affords an organic solution, which is diluted with water to precipitate the crude product. The resulting solid is collected by filtration, washed with water, and dried to afford 17α-acetoxy-3,20-dioxo-spiro(pregn-4-ene-6,3'-pyrazoline), melting at about 202–218° with decomposition. Purification by recrystallization from acetone-hexane affords the pure material, melting at about 216–223° with evolution of gas at about 190°. An ultraviolet absorption maximum is observed at about 237 millimicrons with a molecular extinction coefficient of about 14,400. In a potassium bromide disc, infrared peaks are observed at about 5.76, 5.82, 5.94, 6.22, and 7.90–7.98 microns. The nuclear magnetic resonance spectrum of this compound exhibits peaks at about 42, 75, 123, 127, 250–300, and 334 cycles per second.

EXAMPLE 2

To a solution of 3 parts of 17α-acetoxy-6-methylene-pregn-4-ene-3,20-dione in 225 parts of tetrahydrofuran is added a solution of 2 parts of diazoethane in 70 parts of ether over a period of about 5 minutes. The resulting reaction mixture is kept at room temperature for about 2 days, and the excess reagent is then decomposed by the addition of approximately 0.1 part of acetic acid. Approximately ½ of the solvent is removed by distillation at reduced pressure, and the remaining organic solution is diluted with water. The tacky precipitate which forms is isolated by decantation, then is extracted with ether, and the resulting ether solution is washed with water. Drying of that organic solution over anhydrous sodium sulfate followed by evaporation to dryness under reduced pressure affords a residue, which is triturated with ether, then recrystallized from acetone-hexane to afford crystalline 17α-acetoxy-3,20-dioxo-spiro[pregn-4-ene-6,3'-(5'-methyl-1-pyrazoline)], melting at about 165–167° with evolution of a gas. Its ultraviolet spectrum exhibits a peak at about 237 millimicrons with a molecular extinction coefficient of about 13,750. Infrared maxima, in chloroform, are observed at about 5.75, 5.82, 5.98, 6.22, and 7.90–7.98 microns.

EXAMPLE 3

To a solution of 2.67 parts of 17β-acetoxy-6-methyleneandrost-4-en-3-one in 225 parts of tetrahydrofuran is added a solution of 2 parts of diazomethane in 70 parts of ether over a period of about 5 minutes. The resulting reaction mixture is stored at room temperature for about 13 days, at the end of which time approximately 0.1 part of acetic acid is added to the mixture for the purpose of destroying any excess diazomethane. This mixture is then reduced to approximately ½ volume by distillation under reduced pressure, and water is added in order to precipitate the crude product. The solid which forms is collected by filtration and dried, then crystallized from acetone-hexane to afford 17β-acetoxy-3-oxo-spiro(androst-4-ene-6,3'-1-pyrazoline), melting at about 170–172° with evolution of a gas. An additional crystallization from acetone-hexane affords material melting at 173–175° with gas evolution. This substance displays an ultraviolet absorption maximum at about 237.5 millimicrons with a molecular extinction coefficient of about 13,900. Infrared peaks, in a potassium bromide disc, are observed at about 5.75, 5.95, 6.22, 6.42, and 7.98 microns. Its nuclear magnetic resonance spectrum exhibits peaks at about 52, 76, 123, 250–300 and 331 cycles per second.

EXAMPLE 4

To a solution of 1.92 parts of a 3-(17β-hydroxy-6-methylene-3-oxoandrost-4-en-17α-yl) propionic acid lactone in 225 parts of tetrahydrofuran is added a solution of 4.2 parts of diazomethane in 70 parts of ether. This reaction mixture is kept at room temperature of about 13 days, after which time approximately 0.1 part of acetic acid is added in order to decompose any excess diazomethane. Removal of the ether by distillation at reduced pressure followed by dilution with water of the remaining organic solution results in precipitation of a tacky solid which is extracted into ethyl acetate. The resulting organic solution is washed with water, dried over anhydrous sodium sulfate and stripped of solvent under reduced pressure. The residual foam-like product is crystallized from acetone-hexane to afford 3-[17β-hydroxy-3-oxo-spiro(androst-4-ene-6,3'-1-pyrazolin)-17α-yl] propionic acid lactone, melting at about 183–185° with evolution of a gas. A second recrystallization from acetone-hexane affords material melting at 190–192° accompanied by gas evolution. An ultraviolet absorption spectrum of this compound exhibits a peak at about 237.5 millimicrons with a molecular extinction coefficient of about 14,512. Infrared absorption maxima, in chloroform, are observed at about 5.62, 5.95, 6.12, and 6.22 microns. This compound displays also nuclear magnetic resonance peaks at about 60, 76, 148, 250–300, and 329 cycles per second.

EXAMPLE 5

When an equivalent quantity of 17β-hydroxy-6-methylene-17α-propynylandrost-4-en-3-one or 6-methylene-17β-propionoxyandrost-4-en-3-one is substituted in the procedure of Example 1, 17β-hydroxy-17α-propynyl-3-oxo-spiro(androst-4-ene-6,3'-1-pyrazoline) and 3-oxo-17β-propionoxy-spiro(androst-4-ene-6,3'-1-pyrazoline), respectively, are produced.

EXAMPLE 6

The substitution of an equivalent quantity of 17α-ethyl-17β-hydroxy-6-methyleneandrost-4-en-3-one or 17α-ethynyl-17β-hydroxy-6-methyleneandrost-4-en-3-one in the procedure of Example 2 results in 17α-ethyl-17β-hydroxy-3-oxo-spiro[androst - 4 - en-6,3'-(5'-methyl-1-pyrazoline)] and 17α-ethynyl-17β-hydroxy-3-oxo-spiro[androst-4-ene-6,3'-(5'-methyl-1-pyrazoline)], respectively.

EXAMPLE 7

When 3.1 parts of 6-methylene-17α-propionoxy-pregn-4-ene-3,20-dione is allowed to react with 3.3 parts of diazopropane according to the processes described in Example 1, 3,20-dioxo-17α-propionoxy-spiro[pregn-4-ene-6,3'-(5'-ethyl-1-pyrazoline)] is obtained.

EXAMPLE 8

The substitution of an equivalent quantity of diazoethane in the procedure of Example 4 results in 3-{17β-hydroxy - 3 - oxo-spiro[androst-4-ene-6,3'-(5'-methyl-1-pyrazolin)]17α-yl} propionic acid lactone.

EXAMPLE 9

To a solution of 2.58 parts of 17β-hydroxy-17α-methyl-6-methyleneandrost-4-en-3-one in 225 parts of tetrahydrofuran is added a solution of 2 parts of diazomethane in 70 parts of ether, and the resulting reaction mixture is stored at room temperature for 13 days. Approximately 0.1 part of acetic acid is added, and the ether is removed by distillation at reduced pressure. Dilution with water results in precipitation of a solid, which is extracted with ethyl acetate. The organic extract is washed with water, dried over anhydrous sodium sulfate, and evaporated to dryness, leaving a foam-like residue. Two recrystallizations from acetone-hexane produces pure 17β-hydroxy-17α-methyl - 3 - oxo-spiro(androst-4-ene-6,3'-1-pyrazoline), melting at about 181–183°. It exhibits an ultraviolet absorption maximum at about 239 millimicrons with a molecular extinction coefficient of about 13,480, infrared absorption peaks, in chloroform, at about 2.75, 6.00, and 6.22 microns, and nuclear magnetic resonance peaks at about 61, 74, 76, 250–300, and 329 cycles per second. This compound is characterized by the following structural formula

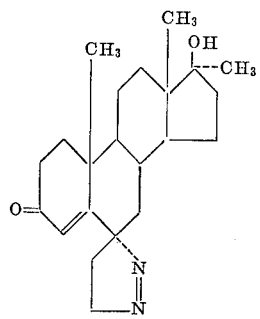

EXAMPLE 10

Method A

A sample of 17α-acetoxy-3,20-dioxo-spiro(pregn-4-ene-6,3'-1-pyrazoline) is heated for about one hour at about 190° under approximately 0.01 mm. pressure. The residual crystalline solid is recrystallized first from acetone-pentane then from aqueous acetone to afford 17α-acetoxy- 3,20-dioxo-spiro(pregn-4-ene-6,1'-cyclopropane), melting at about 223–224.5°. An ultraviolet absorption maximum is observed at about 248 millimicrons with a molecular extinction coefficient of about 13,900 while infrared peaks, in a potassium bromide disc, are displayed at about 3.25, 5.73, 5.81, 5.97, 6.19, and 8.00 microns. Its nuclear magnetic resonance spectrum exhibits peaks at about 27, 42, 75, 122, 126, and 340 cycles per second. This substance is represented by the following structural formula

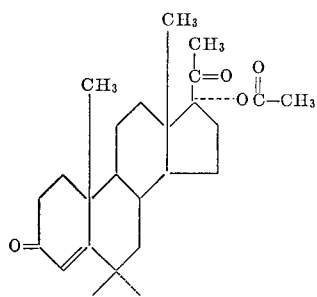

Method B

To a solution of 1.86 parts of 17α-acetoxy-3,20-dioxo-spiro(pregn-4-ene-6,3'-1-pyrazoline) in 24 parts of acetone is added 2 parts by volume of boron trifluoride etherate, and the resulting reaction mixture is allowed to stand at room temperature for about one hour. Water is added to effect precipitation of the crystalline product which is removed by filtration and washed on the filter with water. This material is dried in air to afford 17α-acetoxy-3,20-dioxo-spiro(pregn-4-ene-6,1'-cyclopropane) melting at about 218–223°. Purification by recrystallization as described in Method A results in the pure product, identical with that described in Method A.

EXAMPLE 11

A mixture of 5.15 parts of 17α-acetoxy-3,20-dioxo-spiro[pregn-4-ene-6,3'-(5'-methyl-1-pyrazoline)] in 18 parts of p-tertiary-butyltoluene is heated at the reflux temperature, in a nitrogen atmosphere, for about 45 minutes. Removal of the solvent by steam distillation affords an oily residue which is extracted with ethyl acetate. The organic layer is separated, washed with water, dried over anhydrous sodium sulfate and concentrated to dryness under reduced pressure. The resulting crystalline residue is twice recrystallized from methanol to afford pure 17α-acetoxy - 3,20-dioxo-spiro[pregn-4-ene-6,1'-(2'-methylcyclopropane)], melting at about 251–255°. It exhibits an ultraviolet absorption maximum at about 249 millimicrons with a molecular extinction coefficient of about 12,376, infrared absorption peaks, in a potassium bromide disc, at about 3.26, 5.75, 5.82, 5.95, 6.22, and 7.88–7.92 microns, and also nuclear magnetic resonance absorption peaks at about 31, 36, 43, 63, 68, 74, 123, 126, and 342 cycles per second. This compound is further characterized by the following structural formula

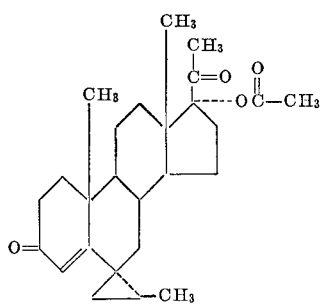

EXAMPLE 12

To a refluxing solution of 1.27 parts of 17α-acetoxy-3,20 - dioxo-spiro(pregn-4-ene-6,1'-cyclopropane) in 88 parts of dry benzene is added, with stirring, 0.72 part of 2,3-dichloro-5,6-dicyano-1,4-benzoquinone, and heating at the reflux temperature is continued for about 48 hours. The reaction mixture is then cooled to room temperature and filtered through diatomaceous earth. The filtrate is washed alternately 3 times with saturated aqueous sodium sulfite and water, then is dried over anhydrous sodium sulfate and concentrated to dryness by evaporation of the solvent at reduced pressure. The residual oily crude product is twice recrystallized from methanol to afford pure crystalline 17α-acetoxy-3,20-dioxo-spiro(pregna-1,4-diene-6,1'-cyclopropane), melting at about 213–216°. An ultraviolet absorption maximum is observed at about 245 millimicrons with a molecular extinction coefficient of about 14,670. This compound exhibits also infrared absorption peaks at about 5.76, 6.02, 6.15, 6.22, and 8.00 microns and is further characterized by the following structural formula

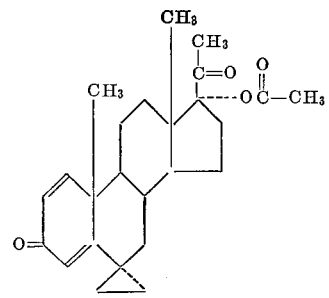

EXAMPLE 13

By substituting an equivalent quantity of 3,20-dioxo-17α - propionoxy - spiro[pregn-4-ene-6,3'-(5'-ethyl-1-pyrazoline)] and otherwise proceeding according to the processes described in Example 11, 3,20-dioxo-17α-propionoxy-spiro[pregn-4-ene-6,1'-(2'-ethylcyclopropane)] is obtained.

EXAMPLE 14

A mixture of 3.44 parts of 17β-acetoxy-3-oxo-spiro-(androst-4-ene-6,3'-1-pyrazoline) with 14 parts of p-tertiary-butyltoluene is heated at the reflux temperature, under nitrogen, for about 15 minutes, then is stripped of solvent by steam distillation. The crystalline material thus produced is collected by filtration, then is recrystallized from hexane to afford pure 17β-acetoxy-3-oxo-spiro-(androst-4-ene-6,1'-cyclopropane), melting at about 155–156°. This compound exhibits an ultraviolet absorption maximum at about 249 millimicrons with a molecular extinction coefficient of about 14,330, infrared absorption maxima, in a potassium bromide disc, at about 3.25, 5.78, 5.98, 6.22, and 8.00 microns and also nuclear magnetic resonance absorption peaks at about 26, 52, 76, 123, and 338 cycles per second. This compound is represented by the following structural formula

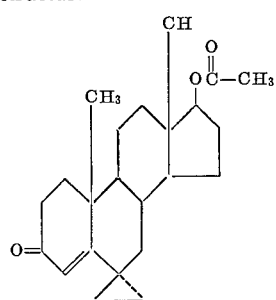

EXAMPLE 15

To a solution of 5.42 parts of 17β-acetoxy-3-oxo-spiro(androst-4-ene-6,1'-cyclopropane) in 256 parts of methanol is added a solution of 5.4 parts of potassium hydroxide in 80 parts of water, and the resulting reaction mixture is kept at room temperature in a nitrogen atmosphere for about 4 hours. Dilution of the reaction mixture with ice and water results in precipitation of the crude crystalline product which is collected by filtration, then recrystallized several times from acetone to afford pure 17β-hydroxy-3-oxo-spiro(androst-4-ene-6,1'-cyclopropane), melting at about 223–227°. This compound exhibits an ultraviolet absorption maximum at about 249.5 millimicrons with a molecular extinction coefficient of about 14,025. It displays also infrared absorption peaks at about 2.86, 3.24, 6.04, and 6.18 microns. The structural formula of this substance is shown below:

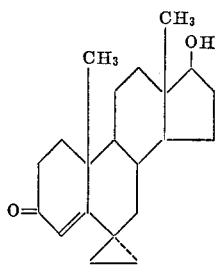

EXAMPLE 16

To a suspension of one part of 17β-hydroxy-3-oxo-spiro(androst-4-ene-6,1'-cyclopropane) in 80 parts of acetone is added in an aqueous solution, 8 N in chromium trioxide and 8 N in sulfuric acid, at a slow dropwise rate until a yellow color, indicating the presence of excess reagent, persists. This addition is conducted at a temperature of 0–2°. At the end of the addition period, approximately 0.1 part of isopropyl alcohol is added to destroy the excess reagent, and the resulting mixture is diluted with sufficient water to just precipitate the chromium salts. The supernatant is decanted from the precipitated chromium salts, and that solution is filtered through diatomaceous earth. Dilution of the filtrate with water results in crystallization of the crude product, melting at about 174–178°. Recrystallization from acetone-hexane affords pure 3,17-dioxo-spiro(androst-4-ene-6,1'-cyclpropane), melting at about 180–181.5°. This compound displays an ultraviolet absorption maximum at about 248 millimicrons with a molecular extinction coefficient of about 14,530. Infrared absorption peaks are observed at about 5.72, 6.00, and 6.20 microns, and its nuclear magnetic resonance spectrum displays peaks at about 25–38, 57, 67, and 339 cycles per second. This compound is characterized further by the following structural formula

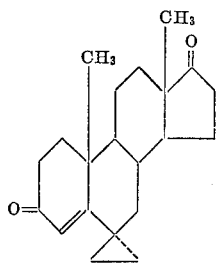

EXAMPLE 17

A mixture of 2.56 parts of lithium tri(tertiary-butoxy) aluminum hydride with 9 parts of tetrahydrofuran is stirred, under nitrogen, until homogeneous, then is cooled to 0–2°. To that solution is added a solution of 1.05 parts of 17β-acetoxy-3-oxo-spiro(androst-4-ene-6,1'-cyclopropane) in 11 parts of tetrahydrofuran at a rapid dropwise rate. After the addition is complete, the reaction mixture is stirred at room temperature for about 3½ hours, then is poured carefully into 187 parts of a mixture of ice and water containing 9.5 parts of acetic acid. The resulting slurry is stirred for about 10 minutes, and the precipitated crystalline solid is collected by filtration, then recrystallized twice from aqueous acetone to afford pure 17β-acetoxy-3β-hydroxy-spiro(androst-4-ene-6,1-cyclopropane), melting at about 165–167°. Infrared absorption peaks, in chloroform, are observed at about 2.74, 5.78, 6.02, and 7.94 microns. This compound is represented by the following structural formula

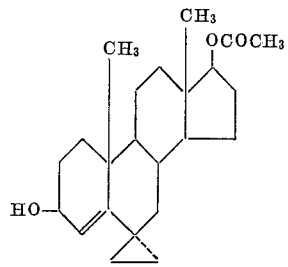

EXAMPLE 18

To a solution of 4 parts of 17β-acetoxy-3β-hydroxy-spiro(androst-4-ene-6,1'-cyclopropane) in 50 parts of pyridine is added 30 parts of acetic anhydride, and the resulting mixture is kept at room temperature for about 16 hours. The addition of ice and water results in precipitation of the crude crystalline product which is collected by filtration and recrystallized from aqueous acetone to afford pure 3β-17β-diacetoxy-spiro-(androst-4-ene-6,1'-cyclopropane) as small needle-like crystals, melting at about 114–115.5°. It is characterized further by the following structural formula

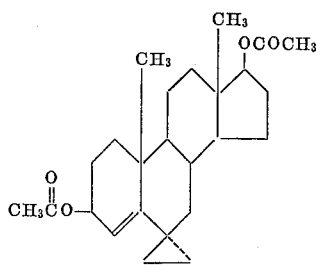

EXAMPLE 19

A mixture of 2.75 parts of 17β-acetoxy-3-oxospiro-(androst-4-ene-6,1'-cyclopropane), 2.03 parts of 2,3-dichloro-5,6-dicyano-1,4-benzoquinone, and 176 parts of benzene is heated at the reflux temperature with stirring for about 48 hours. The reaction mixture is then cooled and filtered, and the filtrate is washed successively with saturated aqueous sodium sulfite, water, and saturated aqueous sodium chloride. Drying over anhydrous sodium sulfate followed by evaporation of the organic solution to dryness affords a foam-like residue of the crude product. Crystallization from ether yields pure 17β-acetoxy-3-oxo-spiro(androsta-1,4-diene-6,1'-cyclopropane), melting at about 149–150°. This compound exhibits an ultraviolet absorption maximum at about 244 millimicrons with a molecular extinction coefficient of 14,960. Infrared absorption maxima are observed at about 5.78, 6.02, 6.18, 6.22, and 7.92 microns. This compound is represented by the following structural formula

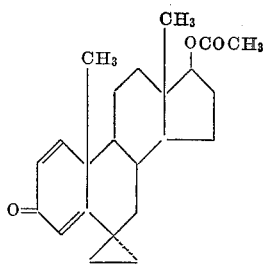

EXAMPLE 20

When an equivalent quantity of 3-oxo-17β-propionoxy-spiro[androst-4-ene-6,3'-(5'-methyl-1-pyrazoline)] is substituted in the procedure of Example 14, there is pro-

EXAMPLE 21

When an equivalent quantity of 17β-hydroxy-17α-methyl-3-oxo-spiro[androst-4-ene-6,3'-(5'-ethyl-1-pyrazoline)] is substituted in the procedure of Example 14, 17β-hydroxy-17α-methyl-3-oxo-spiro[androst-4-ene-6,1'-(2'-ethylcyclopropane)] is obtained.

EXAMPLE 22

When an equivalent quantity of 17α-ethyl-17β-hydroxy-3-oxo-spiro(androst-4-ene-6,3'-1-pyrazoline) is subjected to the reaction conditions of Example 14, 17α-ethyl-17β-hydroxy-3-oxo-spiro(androst-4-ene-6,1'-cyclopropane) is produced.

EXAMPLE 23

The pyrolysis of an equivalent quantity of 17α-ethynyl-17β-hydroxy-3-oxo-spiro(androst-4-ene-6,3'-1-pyrazoline) by the procedure described in Example 14 results in 17α-ethynyl-17β-hydroxy-3-oxo-spiro(androst-4-ene-6,1'-cyclopropane).

EXAMPLE 24

By substituting an equivalent quantity of 17β-hydroxy-3-oxo-17α-propynyl-spiro[androst-4-ene-6,3'-(5'-methyl-1-pyrazoline)] and otherwise proceeding according to the processes described in Example 14, 17β-hydroxy-3-oxo-17α-propynyl-spiro[androst-4-ene-6,1'-(2'-methylcyclopropane)] is obtained.

EXAMPLE 25

When an equivalent quantity of 17β-acetoxy-3-oxo-17α-propynyl-spiro[androst-4-ene-6,3'-(5'-ethyl-1-pyrazoline)] is pyrolyzed by the procedure described in Example 14, 17β-acetoxy-3-oxo-17α-propynyl-spiro[androst-4-ene-6,1'-(2'-ethylcyclopropane)] is produced.

EXAMPLE 26

The reduction of an equivalent quantity of 17α-ethynyl-17β-hydroxy-3-oxo-spiro(androst-4-ene-6,1'-cyclopropane) by the procedure described in Example 17 results in 17α-ethynyl-3β,17β-dihydroxy-spiro(androst-4-ene-6,1'-cyclopropane).

EXAMPLE 27

By substituting an equivalent quantity of 17α-ethynyl-3β,17β-dihydroxy-spiro(androst-4-ene-6,1'-cyclopropane) and conducting the reaction at about 100°, but otherwise proceeding according to the processes described in Example 18, 3β,17β-diacetoxy-17α-ethynyl-spiro(androst-4-ene-6,1'-cyclopropane) is obtained.

EXAMPLE 28

The substitution of equivalent quantities of 17α-ethynyl-3β,17β-dihydroxy-spiro(androst-4-ene-6,1'-cyclopropane) and propionic anhydride in the procedure of Example 18, utilizing a reaction temperature of about 100°, results in 17α-ethynyl-3β,17β-dipropionoxy-spiro(androst-4-ene-6,1'-cyclopropane).

EXAMPLE 29

To 105 parts of liquid ammonia is added portionwise 0.225 part of lithium wire and the mixture is stirred until solution is complete. To that mixture is then added a solution of 1.4 parts of 17β-acetoxy-3-oxo-spiro(androst-4-ene-6,1'-cyclopropane) in 22.5 parts of dioxane containing 16 parts of ether. The resulting reaction mixture is stirred for about one hour longer, after which time 4 parts of solid ammonium chloride is added cautiously. Evaporation of the ammonia at room temperature yields a residue which is extracted into methylene chloride. The resulting organic solution is washed with water until neutral, then with saturated aqueous sodium chloride. Removal of the solvent by distillation at reduced pressure affords a foam-like residue which is crystallized from acetone to afford 17β-acetoxy-3-oxo-spiro-(5α-androstan-6,1'-cyclopropane), melting at about 185–195°. A pure sample is obtained by chromatography on silica gel followed by elution with mixtures of benzene and ethyl acetate.

EXAMPLE 30

By substituting an equivalent quantity of 17β-acetoxy-3-oxo-spiro-(5α-androstan-6,1'-cyclopropane) and otherwise proceeding according to the processes described in Example 15, 17β-hydroxy-3-oxo-spiro-(5α-androstan-6,1'-cyclopropane) is obtained.

EXAMPLE 31

A mixture of 3.58 parts of 17β-acetoxy-3-oxo-spiro-(5α-androstan-6,1'-cyclopropane), 2.5 parts of 2,3-dichloro-5,6-dicyano-1,4-benzoquinone and 300 parts of dioxane is heated at the reflux temperature with stirring for about 24 hours, then is cooled to room temperature and filtered in order to remove the reduced reagent. The filtrate is extracted with benzene, and the organic layer is separated, washed successively with water, saturated aqueous sodium sulfite, water, and saturated aqueous sodium chloride, then dried over anhydrous sodium sulfate and stripped of solvent at reduced pressure, thus affording 17β-actoxy-3-oxo-spiro-(5α-androst-1-ene-6,1'-cyclopropane).

EXAMPLE 32

To a solution of 5.42 parts of 17β-acetoxy-3-oxo-spiro-(5α-androst-1-ene-6,1'-cyclopropane) in 256 parts of methanol is added a solution of 5.4 parts of potassium hydroxide in 80 parts of water, and that reaction mixture is allowed to stand, under nitrogen, at room temperature for about 4 hours. Dilution with a mixture of ice and water results in precipitation of the product which is collected by filtration and dried, thus affording 17β-hydroxy-3-oxo-spiro-(5α-androst-1-ene-6,1'-cyclopropane.)

EXAMPLE 33

To a solution of one part of 17β-acetoxy-3-oxo-spiro(androst-4-ene-6,1'-cyclopropane) in 5 parts of glacial acetic acid is added successively 0.56 part of ethanedithiol and 0.5 part by volume of boron trifluoride etherate. The resulting reaction mixture is kept at room temperature for about 15 minutes, then is diluted with methanol, and the resulting crystalline product is collected by filtration, washed well on the filter with methanol and dried to yield 17β-acetoxy-3,3-ethylenedithio-spiro(androst-4-ene-6,1'-cyclopropane.)

To a stirred suspension of one part of 17β-acetoxy-3,3-ethylenedithio-spiro(androst-4-ene-6,1'-cyclopropane), 70 parts of liquid ammonia, and 3.5 parts of ether is added portionwise one part of sodium metal. After the addition is complete, a small quantity of ethanol is added dropwise in order to destroy the excess reagent. Evaporation of the ammonia at room temperature affords a residue which is extracted into ether, and the resulting organic solution is washed with water until neutral. Drying over anhydrous sodium sulfate followed by evaporation of the solvent at reduced pressure affords a residue which is purified by chromatography on silica gel utilizing elution with mixtures of benzene and ethyl acetate to afford 17β-hydroxy-spiro(androst-4-ene-6'-cyclopropane.)

EXAMPLE 34

A mixture of one part of 17β-hydroxy-spiro-(androst-4-ene-6,1'-cyclopropane), 10 parts of pyridine, and 8 parts of acetic anhydride is kept at room temperature for about 16 hours, then is diluted by the addition of ice and water. The resulting precipitate is collected by filtration and dried in air to afford 17β-acetoxy-spiro(androst-4-ene-6,1'-cyclopropane.)

EXAMPLE 35

A solution of 1.5 parts of 3-[17β-hydroxy-3-oxo-spiro(androst-4-ene-6,3'-1-pyrazolin)-17α-yl] propionic acid lactone in 27 parts of p-tertiary-butyl-toluene is heated at the reflux temperature, in a nitrogen atmosphere, for about 30 minutes, then is stripped of solvent by steam distillation. The resulting residue is extracted with a mixture of ethyl acetate and methylene chloride, and the organic layer is separated, washed successively with water and saturated aqueous sodium chloride, then dried over anhydrous sodium sulfate and evaporated to dryness at reduced pressure. The resulting residue is absorbed on a silica gel chromatographic column, then is eluted with 15% ethyl acetate in benzene to afford 3-[17β-hydroxy-3-oxo-spiro(androst-4-ene-6,1'-cyclopropan)-17α-yl] propionic acid lactone, characterized by an ultraviolet absorption maximum at about 248.5 millimicrons with a molecular extinction coefficient of about 12,230. Infrared absorption peaks are observed at about 5.68, 6.02, and 6.24 microns. This compound is characterized further by the following structural formula

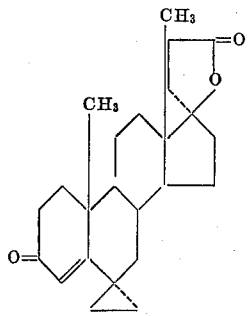

EXAMPLE 36

By substituting an equivalent quantity of 3-{17β-hydroxy-3-oxo-spiro[androst-4-ene-6,3'-(5'-methyl-1-pyrazolin)]-17α-yl} propionic acid lactone or 3-{17β-hydroxy-3-oxo-spiro[androst-4-ene-6,3'-(5'-ethyl-1-pyrazolin)]-17α-yl} propionic acid lactone in the procedure of Example 35, 3-[17β-hydroxy-3-oxo-spiro(androst-4-ene-6,1'-methylcyclopropan)-17α-yl] propionic acid lactone and 3-[17β-hydroxy-3-oxo-spiro(androst-4-ene-6,1'-ethylcyclopropan)-17α-yl] propionic acid lactone are obtained.

EXAMPLE 37

A mixture of 3.09 parts of 17β-acetoxy-3-oxo-spiro(androsta-1,4-diene-6,1'-cyclopropane), 3 parts of potassium hydroxide, 144 parts of methanol, and 45 parts of water is allowed to stand at room temperature, under nitrogen, for about 4 hours. Dilution with a mixture of ice and water results in crystallization of the crude product, melting at about 179–180°. Recrystallization twice from aqueous acetone affords pure 17β-hydroxy-3-oxo-spiro(androsta-1,4-diene-6,1'-cyclopropane), melting at about 180–181.5°. This compound displays an ultraviolet absorption maximum at about 244.5 millimicrons with a molecular extinction coefficient of about 14,750 and also infrared absorption peaks, in chloroform, at about 2.72, 5.98, 6.15, and 6.22 microns. It is characterized further by the structural formula

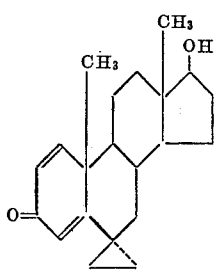

EXAMPLE 38

A solution of 1.57 parts of 17β-hydroxy-17α-methyl-3-oxo-spiro(androst-4-ene-6,3'-1-pyrazoline) in 27 parts of p-tertiary-butyltoluene is heated at the reflux temperature in a nitrogen atmosphere for about 30 minutes, then is steam-distilled to remove the solvent. The residual aqueous mixture is extracted with ethyl acetate and methylene chloride, and that organic layer is separated, washed successively with water and saturated aqueous sodium chloride, then dried over anhydrous sodium sulfate and stripped of solvent at reduced pressure. The residual foam-like product is crystallized first from ether then from ethyl acetate to afford 17β-hydroxy-17α-methyl-3-oxo-spiro(androst-4-ene-6,1'-cyclopropane), melting at about 227–243°. This compound is represented by the following structural formula

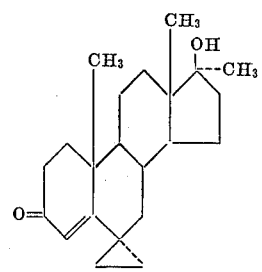

What is claimed is:

1. The process which comprises heating a steroid, the A and B ring structure of which is represented by the partial structural formula

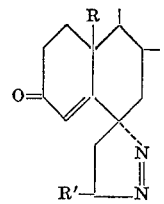

wherein R is selected from the group consisting of hydrogen and a methyl radical, and R' is a member of the class consisting of hydrogen and a lower alkyl radical, to afford a compound represented by the following partial structural formula

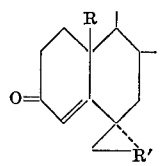

2. The process which comprises contacting a steroid, the A and B ring structure of which is represented by the partial structural formula

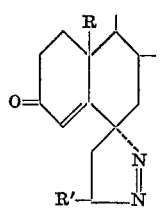

wherein R is selected from the group consisting of hydrogen and a methyl radical, and R' is a member of the class consisting of hydrogen and a lower alkyl radical, with an acidic catalyst to afford a compound represented by the following partial structural formula

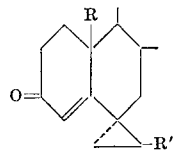

3. A compound of the formula

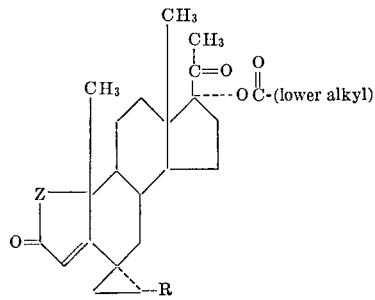

wherein R is selected from the group consisting of hydrogen and a lower alkyl radical, and Z is a member of the class consisting of ethylene and vinylene radicals.

4. 17α - acetoxy - 3,20 - dioxo - spiro(pregn - 4 - ene - 6,1'-cyclopropane).

5. 17α - acetoxy - 3,20 - dioxo - spiro[pregn - 4 - ene - 6,1'-(2'-methylcyclopropane)].

6. 17α - acetoxy - 3,20 - dioxo - spiro(pregna - 1,4 - diene-6,1'-cyclopropane).

7. A compound of the formula

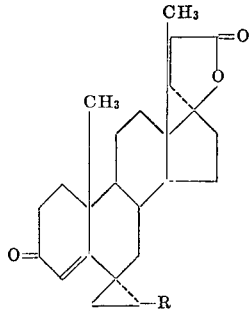

wherein R is a member of the class consisting of hydrogen and a lower alkyl radical.

8. 3 - [17β - hydroxy - 3 - oxo - spiro(androst - 4 - ene-6,1'-cyclopropan)-17α-yl] propionic acid lactone.

9. A compound of the formula

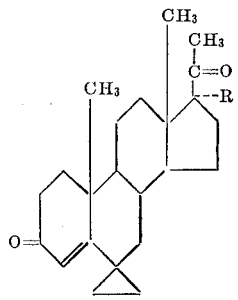

and the corresponding 1-dehydro derivative thereof wherein R is selected from the group consisting of hydrogen and lower acyloxy.

10. A compound of the formula

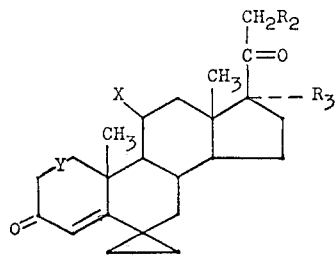

in which
Y is a single or double band;
X is hydrogen, keto or hydroxy;
$R_2$ is hydrogen or fluoro; and
$R_3$ is hydrogen, hydroxy or lower acyloxy.

No references cited.

HENRY A. FRENCH, Primary Examiner

U.S. Cl. X.R.

260—239.5, 397.3, 397.4, 397.45, 397.47, 999